United States Patent
Wakatsuki et al.

(10) Patent No.: US 11,398,637 B2
(45) Date of Patent: Jul. 26, 2022

(54) FUEL CELL SYSTEM

(71) Applicant: Toyota Jidosha Kabushiki Kaisha, Toyota (JP)

(72) Inventors: Kazutoshi Wakatsuki, Toyota-shi Aichi-ken (JP); Katsuya Komaki, Nagoya-shi Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 16/515,531

(22) Filed: Jul. 18, 2019

(65) Prior Publication Data

US 2020/0067115 A1   Feb. 27, 2020

(30) Foreign Application Priority Data

Aug. 24, 2018 (JP) .............................. JP2018-157460

(51) Int. Cl.
| | |
|---|---|
| *H01M 8/04701* | (2016.01) |
| *H01M 8/04029* | (2016.01) |
| *H01M 8/04044* | (2016.01) |
| *H01M 8/04007* | (2016.01) |
| *H01M 8/04291* | (2016.01) |
| *H01M 8/04119* | (2016.01) |

(52) U.S. Cl.
CPC ... *H01M 8/04723* (2013.01); *H01M 8/04029* (2013.01); *H01M 8/04037* (2013.01); *H01M 8/04044* (2013.01); *H01M 8/04059* (2013.01); *H01M 8/04067* (2013.01); *H01M 8/04164* (2013.01); *H01M 8/04291* (2013.01); *H01M 2250/20* (2013.01); *Y02E 60/50* (2013.01); *Y02P 70/50* (2015.11); *Y02T 90/40* (2013.01)

(58) Field of Classification Search
CPC ......... H01M 2250/20; H01M 8/04029; H01M 8/04037; H01M 8/04044; H01M 8/04059; H01M 8/04067; H01M 8/04164; H01M 8/04291; H01M 8/04723; Y02E 60/50; Y02P 70/50; Y02T 90/40
See application file for complete search history.

(56) References Cited

U.S. PATENT DOCUMENTS

| | | | | |
|---|---|---|---|---|
| 2001/0049906 | A1* | 12/2001 | Shimazu ................. | B01F 3/022 48/76 |
| 2002/0015870 | A1* | 2/2002 | Cownden .................. | C01B 3/38 429/413 |
| 2002/0184901 | A1* | 12/2002 | Ishikawa ................. | F28F 27/00 62/171 |
| 2003/0148155 | A1* | 8/2003 | Matthews ......... | H01M 8/04029 429/430 |
| 2008/0152976 | A1* | 6/2008 | Uehara ............. | H01M 8/04059 429/437 |
| 2015/0221964 | A1* | 8/2015 | Fellows ............ | H01M 8/04029 429/429 |

FOREIGN PATENT DOCUMENTS

| | | |
|---|---|---|
| JP | 2001-357864 A | 12/2001 |
| JP | 2002-372385 A | 12/2002 |

* cited by examiner

*Primary Examiner* — Lingwen R Zeng
(74) *Attorney, Agent, or Firm* — Dinsmore & Shohl LLP

(57) ABSTRACT

Provided is a fuel cell system including a fuel cell, a radiator that is provided in a circulation path of coolant that cools the fuel cell, a spray unit that sprays, toward the radiator, generated water that has been generated in and discharged from the fuel cell, and a heating unit that is provided in a supply path of the generated water from the fuel cell to the spray unit and heats the generated water.

6 Claims, 4 Drawing Sheets

FUEL CELL SYSTEM

CROSS-REFERENCE TO RELATED APPLICATION

This application is based on and claims priority under 35 USC 119 from Japanese Patent Application No. 2018-157460 filed on Aug. 24, 2018, the disclosure of which is incorporated by reference herein.

BACKGROUND

Technical Field

The present disclosure relates to a fuel cell system.

Related Art

Systems that use a condenser to recover the water of water vapor generated inside a fuel cell and spray the recovered water toward the front surface of a radiator are conventionally known (e.g., Japanese Patent Application Laid-open (JP-A) No. 2001-357864). When the water is sprayed toward the front surface of the radiator, the latent heat of evaporation accompanying the evaporation of the water improves the cooling performance of the radiator.

In this connection, radiators are trending toward being downsized due to reductions in waste heat and enhancements in performance resulting from improvements in installability with respect to vehicles and improvements in fuel economy. For that reason, the surface area of radiators is trending toward being reduced. When the surface area of the radiator is reduced, even when the water recovered from the fuel cell (the generated water) is sprayed toward the front surface of the radiator, the quantity of the water droplets sticking to the surface of the radiator is reduced, and even when the water droplets do stick to the surface, the region that retains the water droplets is reduced, so the water droplets stick for a shorter amount of time.

In other words, it becomes easier for the water droplets sticking to the surface of the radiator to be blown off the surface by traveling air, for example, before vaporizing (evaporating). In this way, when the radiator is downsized, it becomes difficult to efficiently utilize the latent heat of evaporation of the water droplets sticking to the surface of the radiator.

Stated differently, there is room for improvement with respect to vaporizing all the water sprayed toward the radiator and improving the cooling performance of the radiator.

SUMMARY

Therefore, the present disclosure provides a fuel cell system that can promote vaporization of the generated water that has been sprayed toward the radiator.

In order to achieve the above object, a fuel cell system of a first aspect of the disclosure includes a fuel cell, a radiator that is provided in a circulation path of coolant that cools the fuel cell, a spray unit that sprays, toward the radiator, water that has been generated in and discharged from the fuel cell, and a heating unit that is provided in a supply path of the generated water from the fuel cell to the spray unit and that heats the generated water.

According to the first aspect of the disclosure, the generated water that has been generated in and discharged from the fuel cell is heated by the heating unit before it is sprayed toward the radiator. In other words, the generated water that has been heated is sprayed toward the radiator. Consequently, the difference between the water vapor pressure of the water droplet surfaces of the generated water and the water vapor pressure in the atmosphere becomes greater, and vaporization of the generated water that has been sprayed toward the radiator is promoted.

A fuel cell system of a second aspect of the disclosure is the fuel cell system of the first aspect, further including a bypass path that is provided, via a switching valve, between the supply path and the spray unit on an upstream side of the heating unit in a supply direction of the generated water; a temperature detection unit that detects a temperature of the generated water on an upstream side of the switching valve in the supply direction of the generated water; and a control unit which, in a case in which the temperature detected by the temperature detection unit is equal to or greater than a reference value, switches the switching valve such that the generated water flows to the bypass path.

According to the second aspect of the disclosure, when the temperature detected by the temperature detection unit is equal to or greater than the reference value, the switching valve is switched so as to flow the generated water to the bypass path. In other words, when the temperature detected by the temperature detection unit is equal to or greater than the reference value, the generated water does not need to be heated by the heating unit. In this way, the generated water can be heated as needed, so energy is saved in the fuel cell system.

A fuel cell system of a third aspect of the disclosure is the fuel cell system of the first aspect, further including a first temperature detection unit that detects a temperature of the coolant on the upstream side of the radiator in the circulation direction of the coolant, a second temperature detection unit that detects a temperature of the generated water, and a control unit that controls a heating amount of the heating unit by comparing the temperature of the coolant detected by the first temperature detection unit and the temperature of the generated water detected by the second temperature detection unit.

According to the third aspect of the disclosure, the heating amount of the heating unit is controlled by comparing the temperature of the coolant detected by the first temperature detection unit and the temperature of the generated water detected by the second temperature detection unit. In other words, the generated water that becomes sprayed from the spray unit is heated without waste. Consequently, energy is saved in the fuel cell system.

A fuel cell system of a fourth aspect of the disclosure is the fuel cell system of the third aspect, wherein the control unit raises the heating amount of the heating unit in a case in which the temperature of the generated water is lower than the temperature of the coolant and lowers the heating amount of the heating unit in a case in which the temperature of the generated water is equal to or greater than the temperature of the coolant.

According to the fourth aspect of the disclosure, the control unit raises the heating amount of the heating unit when the temperature of the generated water is lower than the temperature of the coolant and lowers the heating amount of the heating unit when the temperature of the generated water is equal to or greater than the temperature of the coolant. Consequently, the generated water that becomes sprayed from the spray unit is inhibited from being heated more than necessary.

A fuel cell system of a fifth aspect of the disclosure is the fuel cell system of the first or second aspect, wherein the heating unit is a heat exchanger that exchanges heat between the circulation path and the supply path.

According to the fifth aspect of the disclosure, the heating unit is a heat exchanger that exchanges heat between the circulation path and the supply path. In other words, the generated water flowing through the supply path is heated utilizing the waste heat of the fuel cell via the coolant flowing through the circulation path. Consequently, the configuration of the fuel cell system itself is simple, and energy is saved in the fuel cell system.

A fuel cell system of a sixth aspect of the disclosure is the fuel cell system of any one of the first to fourth aspects, wherein the heating unit is an electric heater.

According to the sixth aspect of the disclosure, the heating unit is an electric heater. Here, it is easy to control the heating amount of the electric heater. Consequently, the generated water that becomes sprayed from the spray unit is efficiently heated.

According to the disclosure, vaporization of the generated water that has been sprayed toward the radiator can be promoted.

BRIEF DESCRIPTION OF THE DRAWINGS

Exemplary embodiments of the present disclosure will be described in detail based on the following figures, wherein.

DETAILED DESCRIPTION

Figure 1:
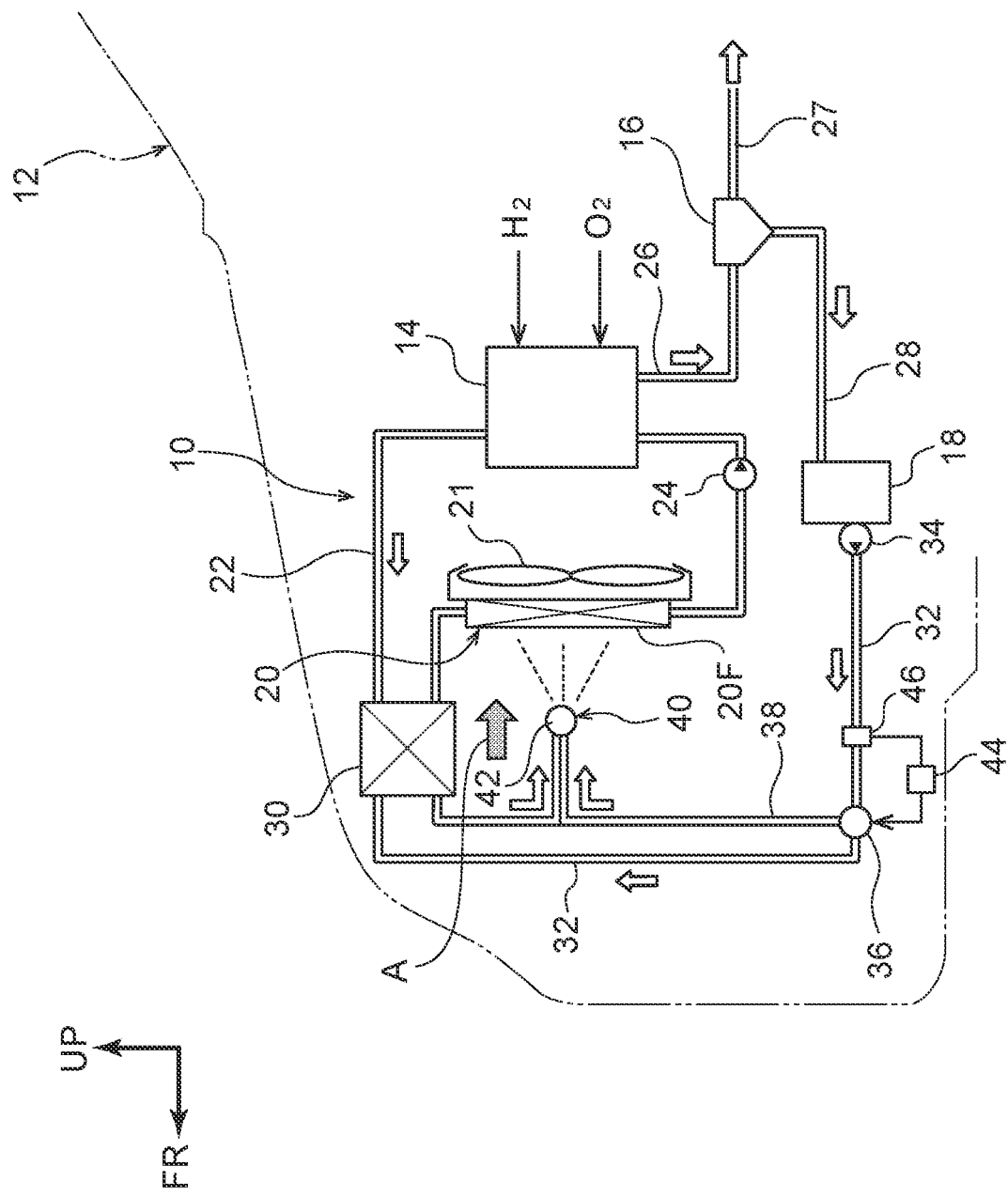
FIG. 1 is a side view schematically showing the configuration of a fuel cell system pertaining to a first embodiment.

Embodiments pertaining to the disclosure will be described in detail below based on the drawings. It will be noted that fuel cell systems 10, 60, and 70 pertaining to the embodiments are mainly installed in a vehicle 12. Consequently, for convenience of description, arrow UP appropriately shown in the drawings indicates a vehicle body upward direction and arrow FR indicates a vehicle body forward direction. Furthermore, when the directions of upper/lower and front/rear are used without further specification in the following description, these mean upper/lower in the vehicle body up and down direction and front/rear in the vehicle body front and rear direction.

Moreover, in what follows, there are cases where the upstream side in a direction in which coolant that cools a fuel cell 14 (described later) circulates is simply called "the upstream side" and the downstream side in the circulation direction is simply called "the downstream side." Likewise, in what follows, there are cases where the upstream side in a direction in which generated water that becomes discharged from the fuel cell 14 is supplied to a spray device 40 (described later) is simply called "the upstream side" and the downstream side in the supply direction is simply called "the downstream side."

First Embodiment

First, a fuel cell system 10 pertaining to a first embodiment will be described. As shown in FIG. 1, the fuel cell system 10 has a fuel cell 14 that is installed in a vehicle 12. The fuel cell 14 is a battery that generates electricity as a result of hydrogen ($H_2$) and air including oxygen ($O_2$), which are fuel, being supplied thereto and drives a motor (not shown in the drawings), for example, that allows the vehicle 12 to travel.

Specifically, the fuel cell 14 is equipped with plural cells (not shown in the drawings) and is configured in such a way that electricity is generated by hydrogen flowing between a positive post (anode, fuel post) of the cell and a separator (not shown in the drawings) on the positive post side and air including oxygen flowing between a negative post (cathode, air post) of the cell and a separator on the negative post side.

It will be noted that at this time the fuel cell 14 emits heat. For that reason, the fuel cell 14 is cooled (has its heat absorbed) by coolant flowing inside. Specifically, the fuel cell system 10 has a first flow passage 22 configuring a circulation path on which the coolant that cools the fuel cell 14 circulates in the counter-clockwise direction shown in FIG. 1.

A radiator 20 and a first pump 24 that is a water pump are connected in series sequentially from the upstream side to the first flow passage 22. It will be noted that an electric fan 21 for drawing cooling air into the radiator 20 from the vehicle body front side is disposed opposing the vehicle body rear side of the radiator 20. The coolant exchanges heat with, and is cooled by, the cooling air and traveling air (indicated by arrow A in FIG. 1) that is generated when the vehicle 12 travels.

Furthermore, the fuel cell 14 generates water, which is a compound of hydrogen and oxygen, as it generates electricity. Consequently, here, this water will be called "generated water." The generated water is discharged from the fuel cell 14 through an exhaust gas pipe 26 together with exhaust gas to a gas-liquid separator 16. The exhaust gas that has been separated by the gas-liquid separator 16 travels through an exhaust gas pipe 27, passes through a muffler (not shown in the drawings), and is released into the atmosphere.

Meanwhile, the generated water that has been separated by the gas-liquid separator 16 (including also water that has exceeded the saturated water vapor quantity in the exhaust gas as a result of the temperature dropping inside the gas-liquid separator 16) is fed through a liquid feed pipe 28 to a water storage tank 18. One end portion of a second flow passage 32 configuring the supply path is connected to the water storage tank 18 via a second pump 34 that is a water pump.

A spray device 40 serving as a spray unit that sprays the generated water toward the front surface of the radiator 20 is connected to the other end portion of the second flow passage 32. In an intermediate portion of the second flow passage 32 on the downstream side of a later-described electromagnetic switching valve 36 and on the upstream side of the spray device 40 and in an intermediate portion of the first flow passage 22 on the downstream side of the fuel cell 14 and on the upstream side of the radiator 20, a single heat exchanger 30 is provided straddling both the second flow passage 32 and the first flow passage 22.

The heat exchanger 30 exchanges heat between the coolant flowing inside the first flow passage 22 and the generated water flowing inside the second flow passage 32 and configures a heating unit that uses the waste heat of the coolant flowing inside the first flow passage 22 to heat the generated water flowing inside the second flow passage 32.

Furthermore, one end portion of a third flow passage 38 configuring a bypass path is connected via an electromagnetic switching valve 36 serving as a switching valve to the second flow passage 32 on the upstream side of the heat exchanger 30. The other end portion of the third flow passage 38 is connected to the spray device 40.

The spray device 40 has a pipe-shaped (cylindrical) body portion 42 that extends in the vehicle width direction in front of the radiator 20, and numerous spray holes (spray nozzles) not shown in the drawings are formed along the longitudinal direction (axial direction) of the body portion 42 in the outer peripheral surface of the body portion 42 opposing a front surface 20F of the radiator 20. Consequently, the generated water inflowing to the body portion 42 at a predetermined pressure through the second flow passage 32 or the third flow passage 38 becomes sprayed from the spray holes (spray nozzles) at a predetermined pressure toward the front surface 20F of the radiator 20.

Figure 2:
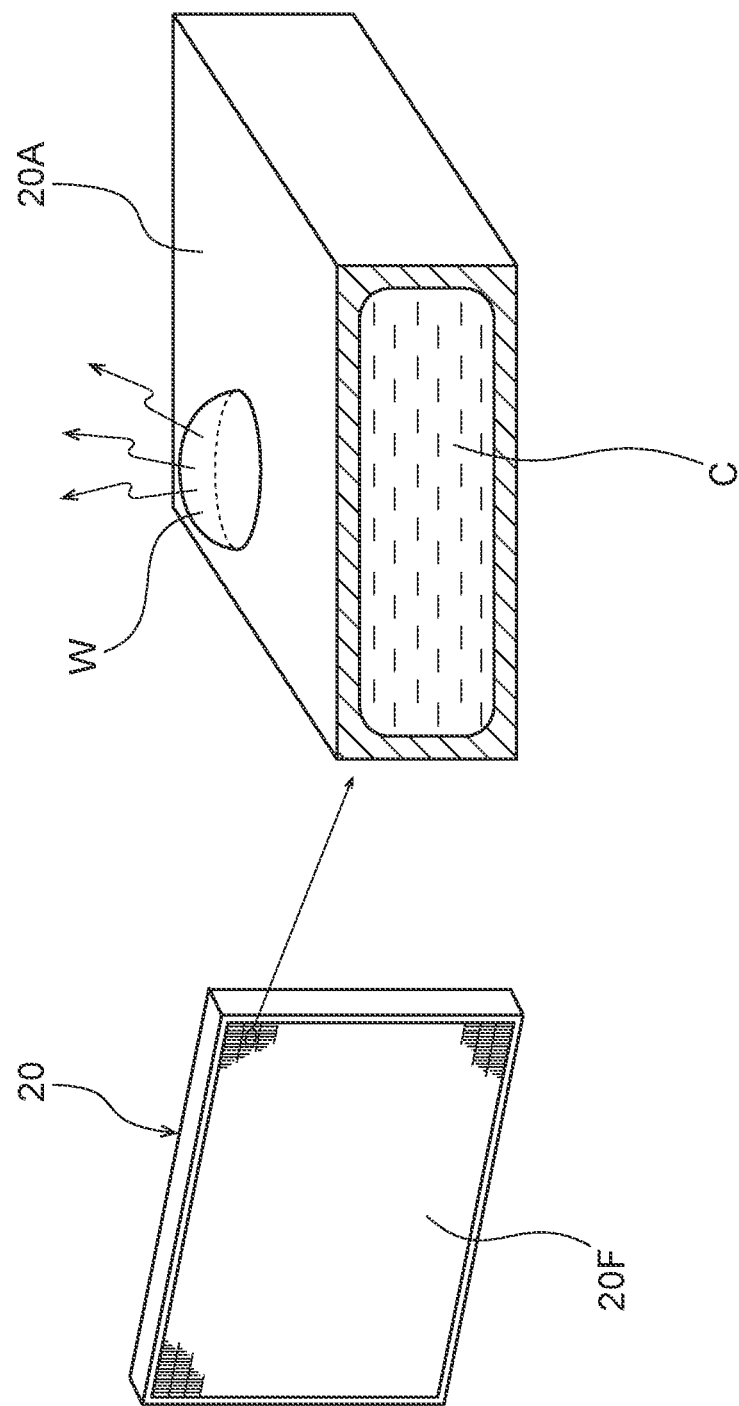
FIG. 2 is a schematic view showing the vaporization of generated water that has been sprayed toward a radiator.

As shown in FIG. 2, the generated water that has been sprayed toward the front surface 20F of the radiator 20 sticks as water droplets W to the surfaces of tubes 20A through which the coolant C flows, and then the water droplets W vaporize (evaporate), thereby taking heat from (cooling) the coolant C via the surfaces of the tubes 20A. It will be noted that the spray device 40 is not limited to the above configuration and, for example, may also be configured by plural spray nozzles (not shown in the drawings) arranged facing the front surface 20F of the radiator 20 on the vehicle width direction outer sides of the radiator 20.

Furthermore, as shown in FIG. 1, a temperature sensor 46 serving as a temperature detection unit that detects the temperature of the generated water flowing through the second flow passage 32 is provided in the second flow passage 32 on the upstream side of the electromagnetic switching valve 36. The temperature sensor 46 and the electromagnetic switching valve 36 are both electrically connected to a control device 44 serving as a control unit, and the electromagnetic switching valve 36 is configured to be opened and closed by the control device 44.

That is, when the control device 44 has judged that the temperature detected by the temperature sensor 46 is less than a temperature (e.g., 90° C.) serving as a predetermined reference value, the control device 44 controls the electromagnetic switching valve 36 in such a way that the generated water does not flow to the third flow passage 38 but does flow to the heat exchanger 30. In other words, the generated water is sprayed toward the front surface 20F of the radiator 20 after being heated.

When the control device 44 has judged that the temperature detected by the temperature sensor 46 is equal to or greater than the temperature (e.g., 90° C.) serving as the predetermined reference value, the control device 44 controls the electromagnetic switching valve 36 in such a way that the generated water does not flow to the heat exchanger 30 but does flow to the third flow passage 38. In other words, the generated water is sprayed toward the front surface 20F of the radiator 20 without being heated.

Next, the action of the fuel cell system 10 pertaining to the first embodiment having the above configuration will be described.

The fuel cell 14 generates electricity and also generates water (the generated water) as a result of hydrogen and oxygen (air) being supplied thereto. The generated water that has been generated by the fuel cell 14 is discharged through the exhaust gas pipe 26 together with exhaust gas to the gas-liquid separator 16. The exhaust gas that has been separated by the gas-liquid separator 16 travels through the exhaust gas pipe 27, passes through the muffler (not shown in the drawings), and is released into the atmosphere, and the generated water that has been separated by the gas-liquid separator 16 is fed through the liquid feed pipe 28 to the water storage tank 18.

The fuel cell 14 also emits heat as it generates electricity, so the fuel cell 14 is cooled by the coolant flowing inside the first flow passage 22. That is, the coolant is circulated in the counter-clockwise direction shown in FIG. 1 by the first pump 24 and exchanges heat with the fuel cell 14 to thereby cool the fuel cell 14. The coolant that has exchanged heat with, and been heated by, the fuel cell 14 is fed to the heat exchanger 30, where it exchanges heat with the generated water flowing inside the second flow passage 32 and heats the generated water.

The coolant that has passed through the heat exchanger 30 is fed to the radiator 20, and in the radiator 20 the coolant exchanges heat with, and is cooled by, the traveling air and the cooling air that is generated by the electric fan 21. The coolant that has been cooled by the radiator 20 is again fed to the fuel cell 14 and cools the fuel cell 14 (exchanges heat with the fuel cell 14). This process is repeated, whereby the fuel cell 14 continues to be cooled.

The generated water that has been fed from the gas-liquid separator 16 to the water storage tank 18 is pumped at a predetermined pressure into the second flow passage 32 by the second pump 34. The temperature of the generated water that has been pumped into the second flow passage 32 (on the upstream side of the electromagnetic valve 36) is detected by the temperature sensor 46. Here, in a case where the control device 44 has judged that the temperature is less than the reference value (e.g., 90° C.), the control device 44 does not energize the electromagnetic switching valve 36 and leaves the flow passage to the third flow passage 38 shut off.

Because of this, the generated water is pumped through the second flow passage 32 to the heat exchanger 30. The generated water that has been pumped to the heat exchanger 30 exchanges heat with, and is heated by, the coolant that has been pumped to the heat exchanger 30. It will be noted that at this time the temperature of the generated water does not become equal to or greater than 100° C. (is less than 100° C.). The generated water that has been heated in this way is sprayed from the spray holes (spray nozzles) of the spray device 40 toward the front surface 20F of the radiator 20.

As shown in FIG. 2, the generated water that has been sprayed toward the front surface 20F of the radiator 20 becomes water droplets W, sticks to the surfaces of the tubes 20A and fins (not shown in the drawings) configuring the radiator 20, and then vaporizes (evaporates). The coolant is cooled via the surfaces of the tubes 20A and so forth by the latent heat of evaporation accompanying the evaporation of the water droplets W, and as a result the cooling performance of the radiator 20 is improved.

Here, the radiator 20 is trending toward being downsized due to reductions in waste heat and enhancements in performance resulting from improvements in installability with respect to the vehicle 12 and improvements in fuel economy. For that reason, the surface area (the region to which the water droplets W can stick) of the tubes 20A and fins (not shown in the drawings) configuring the radiator 20 is also trending toward being reduced.

When the surface area (the region to which the water droplets W can stick) of the tubes 20A and so forth is reduced, the quantity of the water droplets W sticking to the surfaces of the tubes 20A and so forth is reduced, and even when the water droplets W do stick to the surfaces of the tubes 20A and so forth, the region that retains the water droplets W is reduced, so the water droplets W stick for a shorter amount of time. In other words, it becomes easier for the water droplets W sticking to the surfaces of the tubes 20A and so forth to be blown off the surfaces of the tubes 20A and so forth by traveling air, for example, before vaporizing (evaporating).

In this way, when the radiator 20 is downsized, it becomes difficult to utilize all the water droplets W sticking to the surfaces of the tubes 20A and so forth. Consequently, in order to improve the cooling performance of the radiator 20 that has been downsized, it becomes necessary to raise the evaporation speed of the water droplets W sticking to the surfaces of the tubes 20A and so forth and make it possible for new water droplets W to stick to the surfaces of the tubes 20A and so forth.

Although the detailed formula for calculating the evaporation speed is omitted, because of Fick's laws of diffusion the greater the water vapor pressure difference—which is the difference between the water vapor pressure at the surfaces (evaporation surfaces) of the water droplets W and the water vapor pressure in the air (in the atmosphere) around the water droplets W—is, the greater the evaporation speed becomes. The water vapor pressure at the surfaces of the water droplets W is decided by the temperature of the water droplets W (=the temperature of the coolant), and the water vapor pressure in the air around the water droplets W is determined by the outside air temperature (the ambient temperature). Thus, in order to raise the evaporation speed, it is effective to raise the temperature of the water droplets W.

For that reason, in the fuel cell system 10 pertaining to the present embodiment, the generated water is heated before it is sprayed toward the front surface 20F of the radiator 20. This can promote vaporization (raise the evaporation speed) of the generated water that has been sprayed toward the front surface 20F of the radiator 20. In other words, the cooling performance of the radiator 20 can be improved.

It will be noted that in a case where the control device 44 has judged that the temperature of the generated water detected by the temperature sensor 46 is equal to or greater than the reference value (e.g., 90° C.), the control device 44 energizes the electromagnetic switching valve 36, shuts off the flow passage to the second flow passage 32 so that the generated water does not flow to the downstream side of the electromagnetic switching valve 36, opens the flow passage to the third flow passage 38, and pumps the generated water into the third flow passage 38. The generated water that has been pumped into the third flow passage 38 is sprayed from the spray holes (spray nozzles) of the spray device 40 toward the front surface 20F of the radiator 20.

In this way, in the fuel cell system 10 pertaining to the first embodiment, when the temperature detected by the temperature sensor 46 is equal to or greater than the reference value, the electromagnetic switching valve 36 is switched so as to flow the generated water to the third flow passage 38. In other words, when the temperature detected by the temperature sensor 46 is equal to or greater than the reference value, the generated water is sprayed toward the front surface 20F of the radiator 20 without being heated by the heat exchanger 30 (heating unit). In this way, the generated water can be heated as needed, so energy can be saved in the fuel cell system 10.

Furthermore, in the fuel cell system 10 pertaining to the first embodiment, the heating unit that heats the generated water is the heat exchanger 30 that exchanges heat between the first flow passage 22 (the coolant) and the second flow passage 32 (the generated water). In other words, in this fuel cell system 10, the generated water flowing through the second flow passage 32 is heated by utilizing the waste heat of the fuel cell 14 via the coolant flowing through the first flow passage 22. Consequently, the configuration of the fuel cell system 10 itself is simple, and energy can be saved in the fuel cell system 10.

Second Embodiment

Next, a fuel cell system 60 pertaining to a second embodiment will be described. It will be noted that parts that are the same as those in the first embodiment are assigned the same reference signs and that detailed description thereof (including also shared action) will be appropriately omitted.

Figure 3:
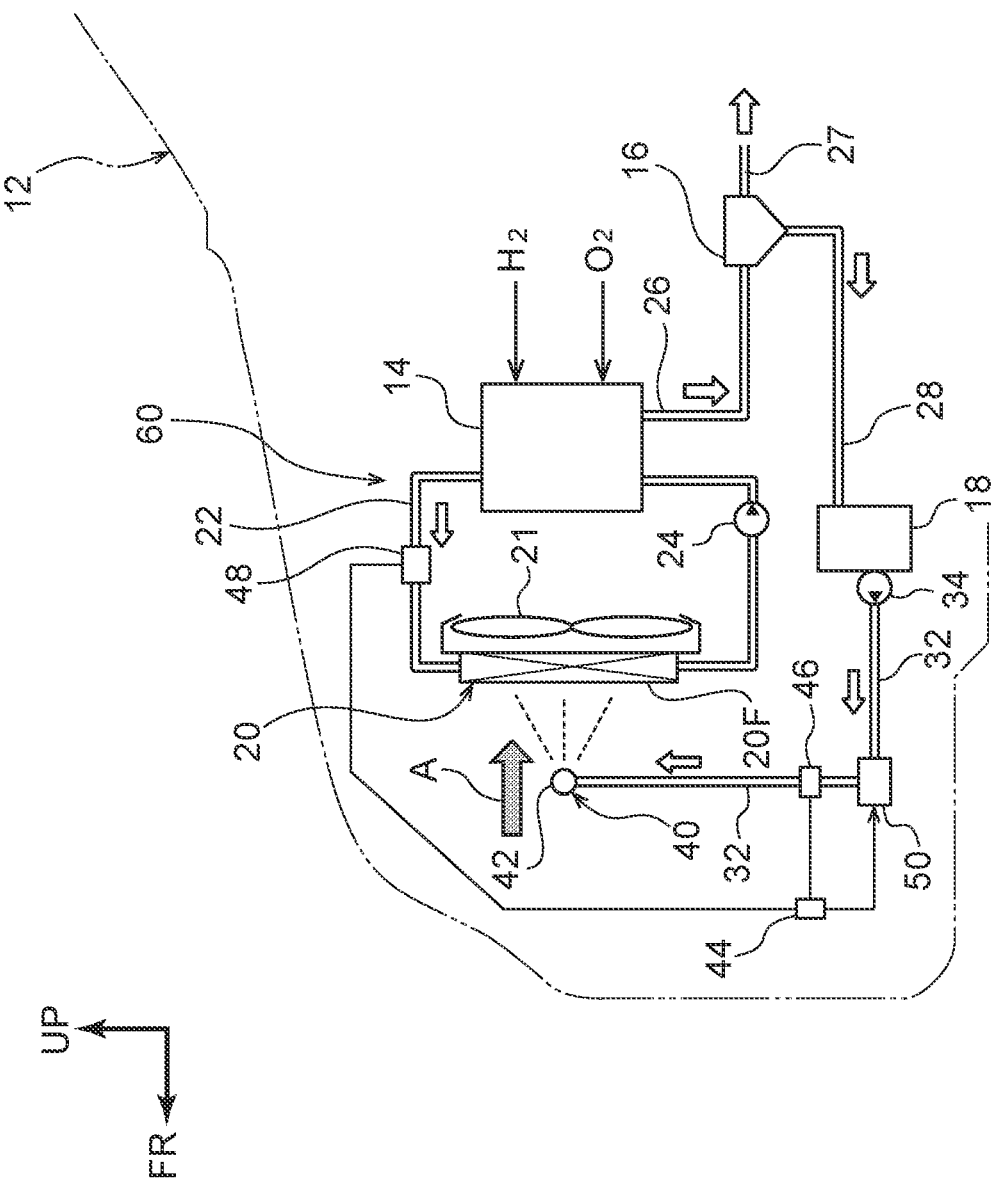
FIG. 3 is a side view schematically showing the configuration of a fuel cell system pertaining to a second embodiment.

As shown in FIG. 3, in the fuel cell system 60 pertaining to the second embodiment, the heat exchanger 30, the third flow passage 38, and the electromagnetic switching valve 36 of the fuel cell system 10 pertaining to the first embodiment are removed. Additionally, instead of the heat exchanger 30, an electric heater 50 serving as a heating unit is provided in an intermediate portion of the second flow passage 32.

Moreover, a temperature sensor 46 serving as a first temperature detection unit is provided in the second flow passage 32 on the downstream side of the electric heater 50, and a temperature sensor 48 serving as a second temperature detection unit is provided in the first flow passage 22 on the downstream side of the fuel cell 14 and on the upstream side of the radiator 20. The temperature sensors 46 and 48 and the electric heater 50 are all electrically connected to the control device 44, and the output (heating amount) and the switching on and off of the electric heater 50 are controlled by the control device 44.

Next, the action of the fuel cell system 60 pertaining to the second embodiment having the above configuration will be described.

The generated water that has been fed from the gas-liquid separator 16 to the water storage tank 18 is pumped at a predetermined pressure into the second flow passage 32 by the second pump 34. The generated water that has been pumped into the second flow passage 32 is heated by the electric heater 50, and the generated water that has been heated is sprayed from the spray holes (spray nozzles) of the spray device 40 toward the front surface 20F of the radiator 20.

Here, in the fuel cell system 60 pertaining to the second embodiment, the temperature of the generated water on the downstream side of the electric heater 50 is detected by the temperature sensor 46. Furthermore, the temperature of the coolant on the downstream side of the fuel cell 14 and on the upstream side of the radiator 20 is detected by the temperature sensor 48.

In a case where the control device 44 has judged that the temperature of the generated water detected by the temperature sensor 46 is lower than the temperature of the coolant detected by the temperature sensor 48, the control device 44 raises the output (heating amount) of the electric heater 50 and heats the generated water. Furthermore, in a case where the control device 44 has judged that the temperature of the generated water detected by the temperature sensor 46 is equal to or greater than the temperature of the coolant detected by the temperature sensor 48, the control device 44 lowers the output (heating amount) of the electric heater 50 and heats the generated water or switches off the electric heater 50.

In other words, in the fuel cell system 60 pertaining to the second embodiment, the control device 44 controls the heating amount of the electric heater 50 (including switching off the electric heater 50) by comparing the temperature of the generated water detected by the temperature sensor 46 and the temperature of the coolant detected by the temperature sensor 48. Consequently, the generated water that becomes sprayed from the spray device 40 can be inhibited from being heated more than necessary (heated without waste), and energy can be saved in the fuel cell system 60.

Moreover, in the fuel cell system 60 pertaining to the second embodiment, the heating unit is the electric heater 50, so it is easy for the control device 44 to control the heating amount of the electric heater 50 (including switching off the electric heater 50). Consequently, the generated water that becomes sprayed from the spray device 40 can be efficiently heated.

Third Embodiment

Finally, a fuel cell system 70 pertaining to a third embodiment will be described. It will be noted that parts that are the same as those in the first embodiment and the second embodiment are assigned the same reference signs and that detailed description thereof (including also shared action) will be appropriately omitted.

Figure 4:
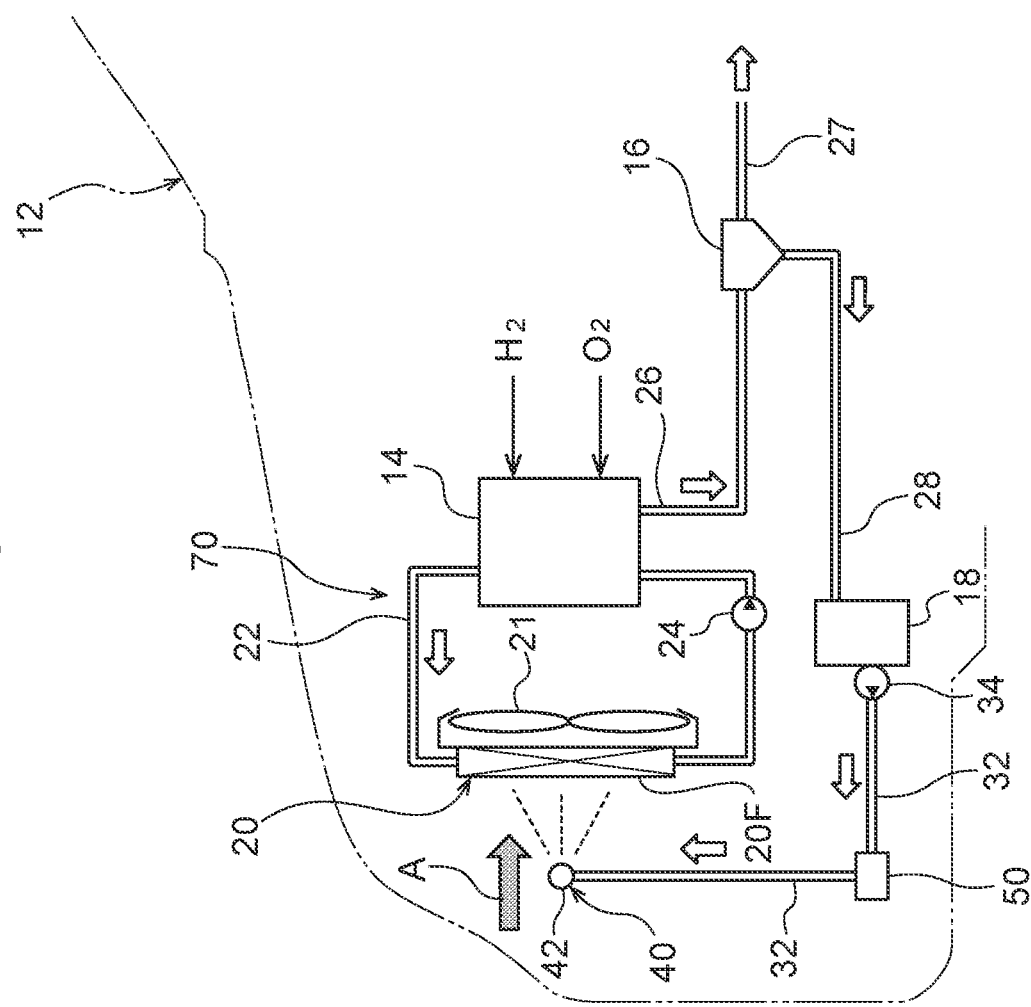
FIG. 4 is a side view schematically showing the configuration of a fuel cell system pertaining to a third embodiment.

As shown in FIG. 4, in the fuel cell system 70 pertaining to the third embodiment, the temperature sensors 46 and 48 of the fuel cell system 60 pertaining to the second embodiment are removed. Consequently, the generated water flowing through the second flow passage 32 is heated by the electric heater 50 regardless of its temperature and thereafter is sprayed from the spray holes (spray nozzles) of the spray device 40 toward the front surface 20F of the radiator 20.

In this way, the fuel cell system 70 pertaining to the third embodiment has the advantage that the configuration of the fuel cell system itself is simple compared to the configurations of the fuel cell system 10 pertaining to the first embodiment and the fuel cell system 60 pertaining to the second embodiment.

The fuel cell systems 10, 60, and 70 pertaining to the embodiments have been described above based on the drawings, but the fuel cell systems 10, 60, and 70 pertaining to the embodiments are not limited to what is shown in the drawings and can have their designs appropriately changed in a range that does not depart from the spirit of the disclosure. For example, the fuel cell systems 10, 60, and 70 pertaining to the embodiments are not limited to configurations applied to the vehicle 12.

Furthermore, in the second embodiment, the temperature sensor 46 may also be provided in the second flow passage 32 on the upstream side of the electric heater 50. Moreover, in the first embodiment, instead of the heat exchanger 30 the electric heater 50 of the second embodiment or the third embodiment may also be provided in just the second flow passage 32.

Furthermore, in the first embodiment to the third embodiment, the fuel cell system may also be configured in such a way that the second pump 34 is not provided in the second flow passage 32 and part of the exhaust gas pipe 26 is connected to the water storage tank 18. In other words, the fuel cell system may also be configured in such a way that the generated water is sprayed from the spray holes (spray nozzles) of the spray device 40 by the pressure of the exhaust gas that becomes discharged from the fuel cell 14.

What is claimed is:

1. A fuel cell system comprising:
   a fuel cell;
   a radiator that is provided in a circulation path of coolant that cools the fuel cell;
   a spray unit that sprays, toward the radiator, water that has been generated in and discharged from the fuel cell;
   a heating unit that is provided in a supply path of the generated water from the fuel cell to the spray unit and that heats the generated water,
   a bypass path that is provided, via a switching valve, between the supply path and the spray unit on an upstream side of the heating unit in a supply direction of the generated water;
   a temperature detection unit that detects a temperature of the generated water on an upstream side of the switching valve in the supply direction of the generated water; and
   a control unit which, in a case in which the temperature detected by the temperature detection unit is equal to or greater than a reference value, switches the switching valve such that the generated water flows to the bypass path.

2. The fuel cell system according to claim 1, wherein the heating unit is a heat exchanger that exchanges heat between the circulation path and the supply path.

3. The fuel cell system according to claim 1, wherein the heating unit is an electric heater.

4. The fuel cell system according to claim 1, wherein the switching valve is an electromagnetic switching valve.

5. A fuel cell system comprising:
   a fuel cell;
   a radiator that is provided in a circulation path of coolant that cools the fuel cell;
   a spray unit that sprays, toward the radiator, water that has been generated in and discharged from the fuel cell;
   a heating unit that is provided in a supply path of the generated water from the fuel cell to the spray unit and that heats the generated water;
   a first temperature detection unit that detects a temperature of the coolant on an upstream side of the radiator in a circulation direction of the coolant;
   a second temperature detection unit that detects a temperature of the generated water; and
   a control unit that controls a heating amount of the heating unit by comparing the temperature of the coolant detected by the first temperature detection unit and the temperature of the generated water detected by the second temperature detection unit.

6. The fuel cell system according to claim 5, wherein the control unit raises the heating amount of the heating unit in a case in which the temperature of the generated water is lower than the temperature of the coolant, and lowers the heating amount of the heating unit in a case in which the temperature of the generated water is equal to or greater than the temperature of the coolant.

* * * * *